(12) United States Patent
Bishop et al.

(10) Patent No.: US 10,827,138 B2
(45) Date of Patent: Nov. 3, 2020

(54) PHOTODETECTOR ARRANGEMENT HAVING AN ADJUSTABLE OUTPUT AND METHOD FOR ADJUSTING AN OUTPUT OF A PHOTODETECTOR ARRANGEMENT

(71) Applicant: ams International AG, Rapperswil (CH)

(72) Inventors: Todd Bishop, Denton, TX (US); Glenn Lee, Plano, TX (US); Dan Jacobs, McKinney, TX (US)

(73) Assignee: ams International AG, Rapperswil (CH)

(*) Notice: Subject to any disclaimer, the term of this patent is extended or adjusted under 35 U.S.C. 154(b) by 0 days.

(21) Appl. No.: 16/304,358

(22) PCT Filed: May 31, 2017

(86) PCT No.: PCT/EP2017/063173
§ 371 (c)(1),
(2) Date: Nov. 26, 2018

(87) PCT Pub. No.: WO2017/207639
PCT Pub. Date: Dec. 7, 2017

(65) Prior Publication Data
US 2019/0297280 A1  Sep. 26, 2019

Related U.S. Application Data

(60) Provisional application No. 62/344,348, filed on Jun. 1, 2016.

(30) Foreign Application Priority Data

Jul. 6, 2016 (EP) .................................... 16178184

(51) Int. Cl.
*H04N 5/355* (2011.01)
*G01J 3/50* (2006.01)
(Continued)

(52) U.S. Cl.
CPC ............ *H04N 5/355* (2013.01); *G01J 1/0492* (2013.01); *G01J 1/4228* (2013.01); *G01J 1/44* (2013.01);
(Continued)

(58) Field of Classification Search
None
See application file for complete search history.

(56) References Cited

U.S. PATENT DOCUMENTS 5,965,873 A   10/1999   Simpson et al.
6,038,023 A   3/2000    Carlson et al.
(Continued)

FOREIGN PATENT DOCUMENTS

| CN | 1705349 A | 12/2004 |
|---|---|---|
| EP | 2118628 | 11/2009 |
| WO | 2008/104928 | 9/2008 |

OTHER PUBLICATIONS

European Patent Office, International Search Report for PCT/EP2017/063173, dated Aug. 21, 2017.
(Continued)

*Primary Examiner* — James M Hannett
(74) *Attorney, Agent, or Firm* — Fish & Richardson P.C.

(57) ABSTRACT

A photodetector arrangement having adjustable output, comprises a photodetector having an array of pixels wherein each pixel. The pixels are arranged to convert electromagnetic radiation into an analog detection data signal, respectively. A readout circuit is coupled to the photodetector and comprises a receiving component and a combining component. The receiving component is arranged to read out detection data signals, to select at least one detection data signal depending on a control signal and to adjust gain and polarity of the selected detection data signal. The combining component is arranged to combine the detection data signals
(Continued)

into one or more output signals to be provided at one or more output terminals. A control unit is coupled to the readout circuit via a control terminal and is arranged to provide the control signal at the readout circuit depending on a set of instructions.

20 Claims, 9 Drawing Sheets

(51) Int. Cl.
| | |
|---|---|
| *H04N 5/3745* | (2011.01) |
| *H04N 5/378* | (2011.01) |
| *G01J 3/46* | (2006.01) |
| *G01J 1/42* | (2006.01) |
| *G01J 1/04* | (2006.01) |
| *G01J 3/51* | (2006.01) |
| *G01J 3/28* | (2006.01) |
| *G01J 1/44* | (2006.01) |

(52) U.S. Cl.
CPC ............ *G01J 3/2803* (2013.01); *G01J 3/462* (2013.01); *G01J 3/506* (2013.01); *G01J 3/513* (2013.01); *H04N 5/378* (2013.01); *H04N 5/3745* (2013.01); *G09G 2320/029* (2013.01); *G09G 2360/145* (2013.01)

(56) References Cited

U.S. PATENT DOCUMENTS

| | | | | |
|---|---|---|---|---|
| 7,595,821 | B2* | 9/2009 | Kikuchi | H04N 5/374 348/230.1 |
| 8,274,051 | B1 | 9/2012 | Aswell et al. | |
| 8,310,577 | B1 | 11/2012 | Neter | |
| 8,553,114 | B2* | 10/2013 | Uchida | H04N 5/361 348/294 |
| 8,570,416 | B2* | 10/2013 | Araki | H01L 27/14643 348/308 |
| 2005/0185073 | A1* | 8/2005 | Watanabe | H01L 27/14609 348/294 |
| 2005/0270392 | A1 | 12/2005 | Kikuchi | |
| 2011/0101205 | A1 | 5/2011 | Tian et al. | |
| 2011/0254974 | A1* | 10/2011 | Daisuke | H04N 9/735 348/223.1 |
| 2012/0001553 | A1* | 1/2012 | Fletcher | G06F 1/325 315/157 |
| 2016/0286152 | A1* | 9/2016 | Kobayashi | H04N 5/37455 |
| 2017/0230569 | A1* | 8/2017 | Sambonsugi | H04N 5/23212 |

OTHER PUBLICATIONS

China National Intellectual Property Administration Office Action issued in Chinese Application No. 201780034088.0, dated Jun. 9, 2020 with English translation of Search Report, 9 pages.

* cited by examiner

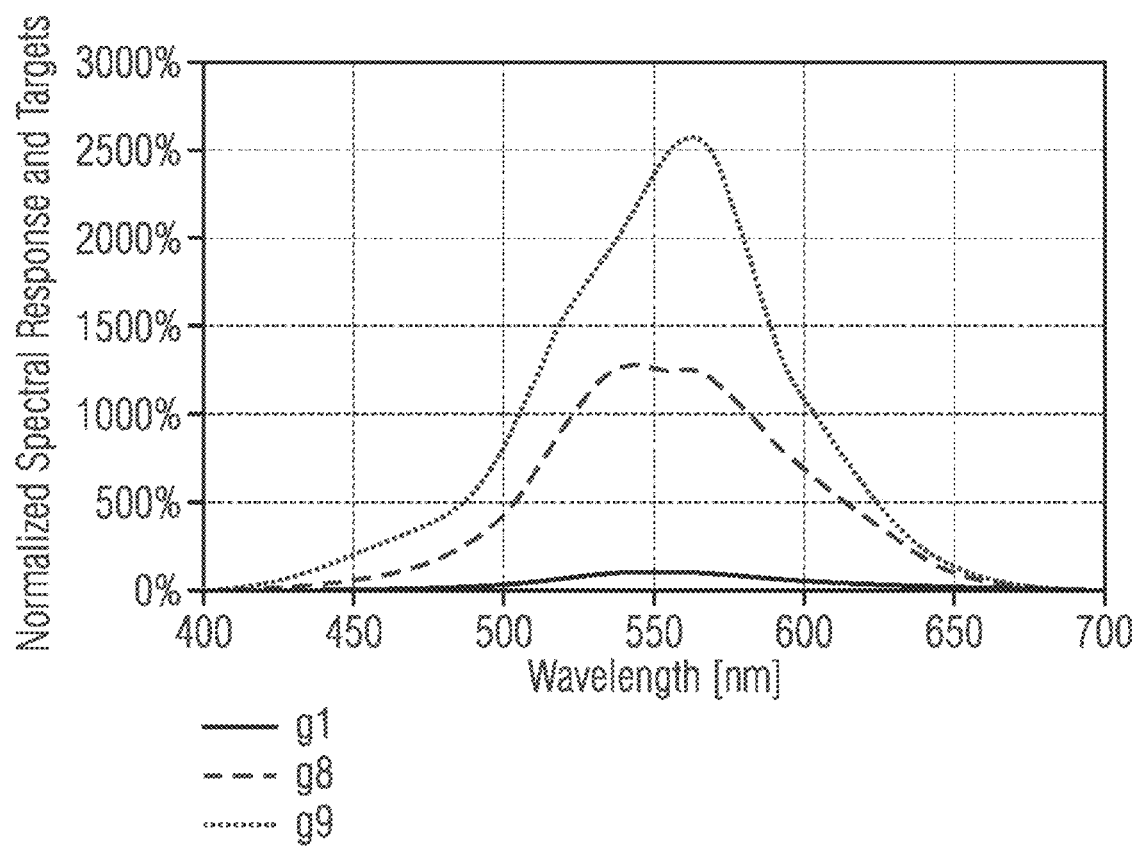

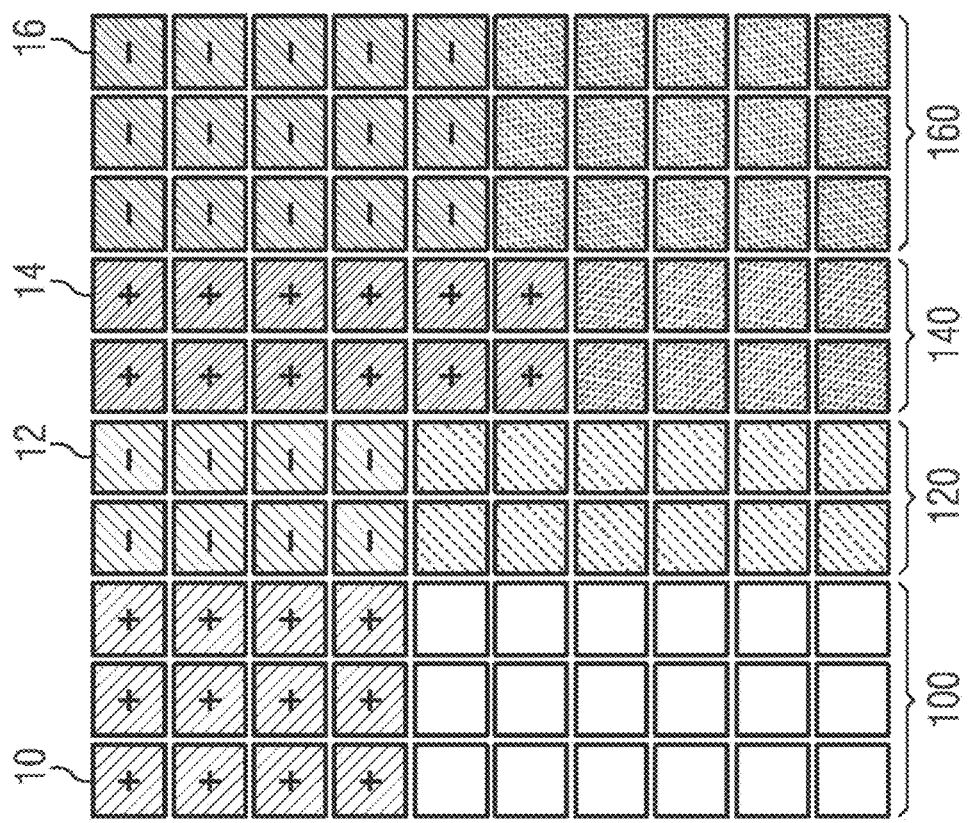
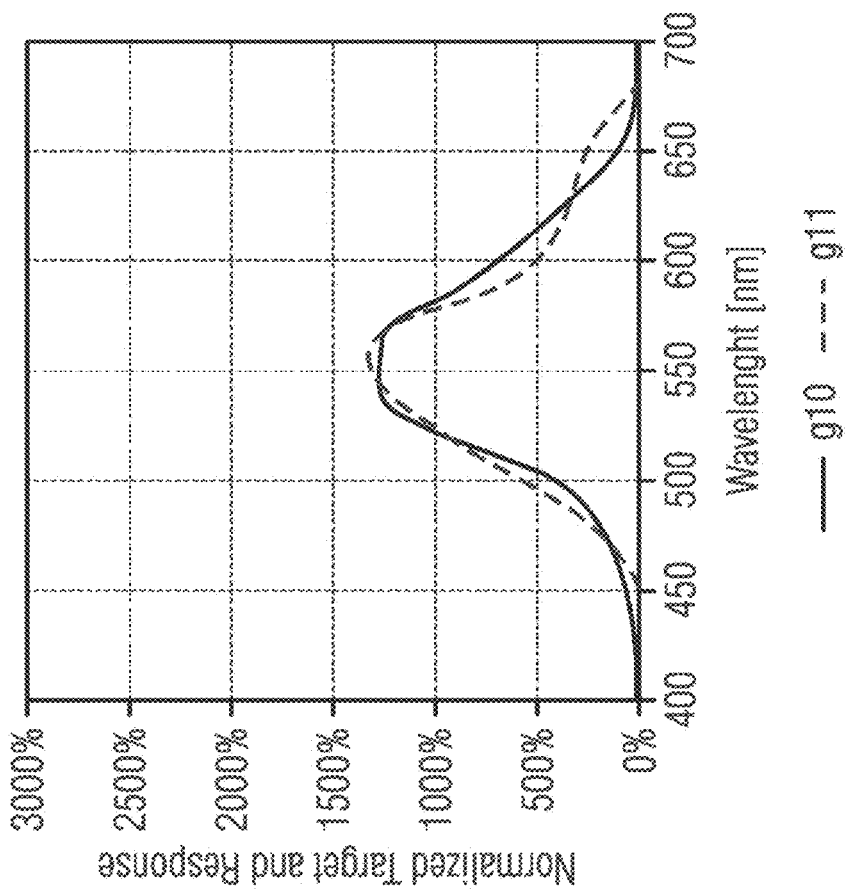
FIG 4

PHOTODETECTOR ARRANGEMENT HAVING AN ADJUSTABLE OUTPUT AND METHOD FOR ADJUSTING AN OUTPUT OF A PHOTODETECTOR ARRANGEMENT

This invention relates to a photodetector arrangement having an adjustable output and to a method for adjusting an output of a photodetector arrangement.

BACKGROUND OF THE INVENTION

Photodetectors are often implemented in mobile electronic devices with displays, such as tablets and smartphones. Typically, a single photodetector design is used in many different devices or shared by multiple versions of each device model. Each device may have different optical properties such as bezel colors around a display glass, i.e. typically a display or front face of an electronic device is covered by glass. Usually, the glass is coated with semi-transparent layers of black, white, or colored paints and inks to create various bezel colors where the photodetector is positioned. In order to produce the appearance of the display bezel, the various paints and inks have very different optical properties that alter the light incident on the photodetector. The magnitude and spectral transmittance vary depending on the bezel color. The result is that each version of a device model passes different light intensity and color to the photodetector.

The problem is that the dynamic range and spectral response of photodetectors are optimized for one optical system. Currently, when photodetectors are applied to manage electronic display devices with multiple bezel colors, there are two outcomes. Uncommonly, a different photodetector is designed and used for each bezel color. The cost and complexity is significantly increases when managing many devices for the same application. More commonly, the performance of the photodetector is compromised by the bezel color variation when the same photodetector is used because the photodetector cannot be optimized for all variations. As a consequence the photodetector performs well for one or some electronic devices and more poorly for others.

It is to be understood that any feature described in relation to any one embodiment may be used alone, or in combination with other features described, and may also be used in combination with one or more features of any other of the embodiments, or any combination of any other of the embodiments unless described as an alternative. Furthermore, equivalents and modifications not described below may also be employed without departing from the scope of the photodetector arrangement having an adjustable output and the method for adjusting an output of a photodetector.

SUMMARY OF THE INVENTION

In at least one embodiment a photodetector arrangement comprises a photodetector, a readout circuit and a control unit. The photodetector arrangement is arranged to have an adjustable output, i.e. adjustable response or spectral response. The response describes a sensor sensitivity, i.e. relative efficiency of detection of electromagnetic radiation such as visible light, infrared and/or ultraviolet radiation, or other signal. A spectral response describes a sensor sensitivity as a function of wavelength, i.e. relative efficiency of detection of electromagnetic light as a function of the frequency or wavelength of the signal.

The photodetector comprises an array of pixels. Each pixel is arranged to convert electromagnetic radiation into an analog detection data signal, respectively. For example, the pixels are photodiodes and generate photocurrent as light is incident on the photodetector array. However, other types of photodetectors can be implemented, such as charge coupled devices (CCD) and CMOS photo sensors, for example. The array may be a one- or two dimensional array.

The readout circuit is coupled to the photodetector and comprises a receiving component and a combining component. The receiving component is arranged to read out analog detection data signals and to select at least one detection data signal depending on a control signal. The combining component is arranged to adjust gain and polarity of the selected detection data signal. Furthermore, the combining component is arranged to combine the detection data signals, i.e. the gain and polarity adjusted signals as well as signals which have not been adjusted, into one or more output signals to be provided at one or more output terminals.

In one embodiment a readout circuit is provided for each pixel in the array. This can be achieved by a direct connection of respective pixels to a corresponding readout circuit, for example. The combining component combines detection data signals from different pixels into a corresponding output signal, respectively. However, the readout circuit can be implemented in a different way as well. For example, the readout circuit could be arranged to relay and multiplex detection data signals from each pixel to a smaller number of (or even just one) output amplifier(s). In an array of photodiodes the readout circuit may comprise a CMOS X-Y readout circuit. In case of other photodetectors such as CCD, there could be a full-frame, frame-transfer, or interline readout.

The control unit is coupled to the readout circuit via a control terminal and is arranged to provide the control signal at the readout circuit depending on a set of instructions. The control unit can be implemented with the photodetector and readout circuit into one common integrated circuit. Alternatively, the control unit can be an external component and connected to the photodetector and readout circuit by electrical interconnections.

In operation the photodetector receives light (or electromagnetic radiation, in general) by means of the pixels in the array. The pixels convert the received light into analog detection data signals, respectively. The readout circuit reads the detection data signals from the pixels. The read out detection data signals can be left as they are or are selected for data (pre-)processing. The processing at least comprises adjusting gain and polarity of selected data signals. For example, the gain of a detection data signal from a selected pixel in the array can be increased or decreased. The gain can be set to 0 which effectively deactivates the pixel in the array, for example. All other possible gain values determine the relative contribution of the selected pixel to the respective output of the photodetector. In a similar manner the polarity of a selected detection data signal can also be adjusted. The plurality effectively determines the sign of the detection data signal. When combined into an output signal the selected detection data signals are either subtracted or added to other data detection signals.

As a result a number of data detection signals (both adjusted or not) are present at the readout circuit. The readout circuit may relay or store the signals until the signals are combined. The readout circuit combines the data detection signals into one or more output signals. The combined output signals are then provided at the respective output terminals. The way the data detection signals are selected and processed (by adjusting gain and polarity) as well as their combination into the one or more output signals are determined by the control signal which is received via the control terminal.

The proposed photodetector arrangement allows for the response of the photodetector to be adjusted in the analog front-end prior to digital conversion. In previous art, the response of photodetectors has been fixed and the sensitivity has been limited. In previous solutions, the response of the photodetectors could only be adjusted after analog-to-digital conversion, and there had to be multiple channels in the photodetector. Using the control signal the output of the photodetector arrangement can be adjusted to mimic or at least be close to a desired target function even if the photodetector arrangement is used in different optical environments. There's no need to develop a dedicated photodetector design for a given optical environment.

For example, detector performance can be adjusted and may not be compromised by bezel color variation. Typically the photodetector arrangement is applied to display systems that will have multiple bezel colors around the displays. The end customer will be able to optimize the spectral response of the photodetector using arithmetic combinations of pixels into ADCs to get improved illuminance and/or colorimetry results for all bezel colors.

The proposed photodetector arrangement enables the photodetector to utilize the response from many pixels differently without requiring analog-to-digital conversion for each pixel. A multiple-channel photodetector is normally limited by the number of converters on the device. In addition, information is lost during analog-to-digital conversion due to quantization. In alternative approaches, if each pixel photocurrent is converted to digital on its own, the dynamic range is significantly reduced in low light conditions by quantization. By arithmetically combining the response of the pixels within the analog front end implemented by the readout circuit, the dynamic range of each pixel is not reduced.

In at least one embodiment of the photodetector comprises a monochromatic array. This is to say that the pixels basically are of the same type and that there is no means to distinguish color information from incident electromagnetic radiation. In such a photodetector array the readout circuit can be used to account for variations in the pixel-to-pixel sensitivity of the detector and/or by distortions in the optical path. The control signal can be used to compensate for different gains and dark currents in array, for example. The control signal could derive from a flat-field correction function, for example.

In at least one embodiment the photodetector comprises a color array. The pixels are arranged into subarrays. In fact, pixels from different subarrays have different spectral response. Pixels from the same subarray, however, have the same spectral response. For example, the subarrays comprises neighboring pixels which are located next to each other.

However, the subarrays do not necessarily need to have neighboring pixels. The pixels could also be spread out over the array, e.g. arranged into unit cells of pixels having different spectral response, such as a color matrix.

The combining component is arranged to combine, under control of the control signal, the detection data signals from pixels within the same subarrays and/or to combine the detection data signals from different subarrays into one or more output signals to be provided at the one or more output terminals. This way there can be several output signals which integrate the response from the subarrays instead of individual pixels only. These output signals can be considered channel signals, such as red, green, blue channel, for example.

In an embodiment comprising a color array the pixels of same subarray can be of the same type, such as a photodiode which is sensitive to a certain spectral range by structure. It is also possible that each pixel is covered by a filter or combination of filters to create a certain spectral response. Pixels from the same subarray then have the same filter or combination of filters, or all pixels may have a unique combination of filters. The pixels may be individually selected by the readout circuit and their detection data signals are arithmetically combined and adjusted in gain and/or polarity into respective output signals. The output signals are provided at the output terminals and can then be input into one or more analog-to-digital converters, for example.

In at least one embodiment the pixels are arranged into a first, second, third, and a fourth subarray. A first type of optical filter is deposited over the pixels from the first subarray. A second type of optical filter is deposited over the pixels from the second subarray. A third type of optical filter is deposited over the pixels from the third subarray. Furthermore, a fourth type of optical filter can be deposited over the pixels from the fourth subarray, such as a band pass or "clear" filter. However, there may also not be any filter deposited over these pixels. In this arrangement each subarrays represents pixels which are sensitive to a certain color or range of colors. For example, the subarrays are sensitive to red, green, blue and visible light, thus implementing a CRGB array. Other types of filters and combinations are possible as well and only depend on the specific field of application.

In at least one embodiment the optical filters are standardized according to a color matrix standard. For example, the optical filters comprise unit cells of triples in RGB or quadruples in CMYK, i.e. implement a respective color space. This allows for a photometric response such as photopic or scotopic response.

In at least one embodiment the one or more output terminals are connected to one or more analog-to-digital converters. The one or more analog-to-digital converters are connected to a data register via a channel data input terminals, respectively.

For example, the one analog-to-digital converter receives the combined output signal of one subarray at a first output terminal. The other analog-to-digital converters receive the combined output signals of the other subarrays at a further output terminals, respectively. This way combination of detection data signals and adjustments of gain and polarity can be done completely in the analog domain. Only after that, digital conversion takes place, effectively reducing losses due to quantization. Operation of the analog-to-digital converters can be synchronized or made dependent on the control signal.

In at least one embodiment the analog to digital converters comprise integrating analog-to-digital converters. The integrating analog-to-digital converters allow for integrating detection data signals (adjusted or not) from individual pixels one at a time. Operation such as setting an integration time can be set via the control signal, for example.

In at least one embodiment the control unit comprises a programmable data register. The control signal depends on data values stored in the programmable data register. The values stored in the programmable data register constitute a set of instructions to control and operate the readout circuit and/or the analog-to-digital converters. For example, the values can be considered parameters representing gain and polarity for each pixel, switching or multiplexer states (for each pixel) controlling the combining component, integration time.

In at least one embodiment the control unit comprises a microcontroller. The microcontroller holds a programmable firmware and the control signal is generated by the microcontroller depending on the configuration of the firmware.

The firmware is software that provides control of the photodetector arrangement by generating the control signal.

As software the firmware comprises a set of instructions to control and operate the readout circuit and/or the analog-to-digital converters. For example, values can be parameters such gain and polarity for each pixel, switching or multiplexer states (for each pixel) controlling the combining component, integration time. In particular, the firmware determines data readout, i.e. operation and succession of procedural steps of the readout circuit and data conversion using the analog-to-digital converters.

In at least one embodiment the control unit is connected to a control interface having a control input terminals. The control interface allows for external communication, e. g. in order to receive a set of instructions, firmware or values to store in the data registers and/or microcontroller.

In at least one embodiment the receiving component comprises one or more operational amplifiers. The operational amplifiers are arranged to adjust the gain and the polarity of selected detection data signals.

In at least one embodiment the combining component comprises one or more analog multiplexers. The multiplexers are arranged to combine, under control of the control signal, the detection data signals into one or more output signals to be provided at the one or more output terminals.

In at least one embodiment the control signal depends on a target function. Target function may be a photopic and/or scotopic target function. The control signal alters the output signal(s) of the photodetector arrangement to closely match (or "approximate") the target function in a task-specific way. In a certain sense the adjusted output is similar to a function derived from mathematical function approximation theory. Target functions include photopic and/or scotopic functions, for example.

In at least one embodiment a method for adjusting an output of a photodetector arrangement comprises the following steps. First, for each pixel in an array of pixels, electromagnetic radiation is converted into an analog detection data signal, respectively. The detection signals are then read out and at least one detection signal is selected. Gain and polarity of the selected detection data signal are adjusted depending on a control signal. Finally, the detection signals are combined into one or more output signals.

In at least one embodiment the control signal depends on a target function. By selecting the at least one detection signal, adjusting the gain and the polarity of the selected detection data signal and then combining the detection data signals into one or more output signals resembles one or more target functions.

In at least one embodiment the one or more target functions of photopic and/or scotopic functions.

In the following, the concepts presented above is described in further detail with respect to drawings, in which exemplary embodiments are presented.

BRIEF DESCRIPTION OF THE DRAWINGS

FIG. 3C shows exemplary shifted target curves, FIG. 4 shows an exemplary adjusted spectral response of a photodetector array according to the proposed concept.

DETAILED DESCRIPTION

Figure 1A:
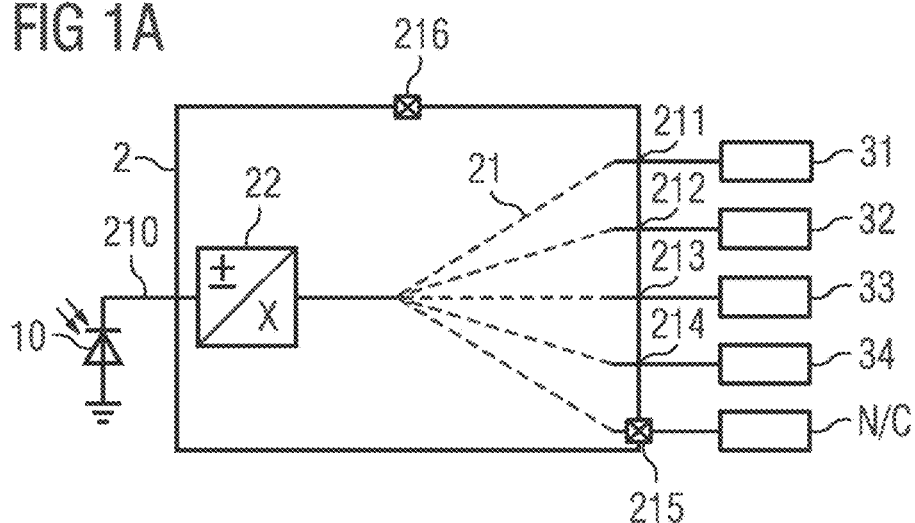
FIG. 1A shows an exemplary embodiment of a photodetector pixel and a readout circuit.

FIG. 1A shows an exemplary embodiment of a photodetector pixel and a readout circuit. A photodetector arrangement 1 according to the present principle comprises an array of several photodetector pixels 10, 12, 14, 16, e.g. a N×M array of N pixels arranged in rows 1 to N and M pixels arranged in columns 1 to M, wherein N and M are integer numbers. Each photodetector pixel 10, 12, 14, 16 in this particular embodiment is implemented as a photodiode.

The drawing shows a single photodiode, or pixel 10, as a representative example of the photodetector arrangement 1. The principles derived for this single pixel can be applied to all pixels in the array. The pixel or photodiode is connected to an input terminal 210 of a readout circuit 2. The readout circuit 2 comprises a receiving component 22, e.g. a gain/polarity component, and a combining component 21. In this embodiment the gain/polarity component 22 and the combining component 21 are connected to each other. Furthermore, the combining component can be connected to at least one of several output terminals of the readout circuit 211, 212, 213, 214, 215. The receiving component is used to read out analog detection data signals from the individual pixels such as pixel 10. For example, the receiving component further comprises a X-Y MOSFET readout circuit (not shown) which is arranged to individually address each pixel in a readout procedure. However, in this exemplary embodiment each pixel in the array is connected to a single, dedicated readout circuit and comprises a respective gain/polarity component and a respective combining component.

Moreover, the readout circuit 2 comprises a control terminal 216 to receive one or more control signals. Thus, operation of the readout circuit 2 can be controlled or programmed via the control terminal 216. The control terminal 216 is coupled to both the gain/polarity component 22 and the combining component 21 (not shown). Finally, each of the output terminals 211, 212, 213, 214, 215 of the readout circuit 2 is connected to one of four parallel analog-to-digital converters 31, 32, 33, 34, respectively. One output terminal 215, however, is not connected to an ADC and can be considered an open switch. This switch will be denoted on/off switch N/C hereinafter.

During operation of the photodetector arrangement 1 the photodiodes or pixels convert incident electromagnetic radiation, such as visible or infrared light, into photocurrent. The photocurrent is received by the readout circuit 2 via the input terminals 210. The received photocurrent is denoted as an analog detection data signal hereinafter. The gain/polarity component 22 sets or adjusts a polarity and a gain of the received analog detection data signal and outputs a polarity and gain adjusted data signal. In other words the polarity/gain component 22 inverts and/or amplifies an analog signal, i.e. the photocurrent from the photodiode. The adjusted signal is sent to the combining component 21. The combining component 21 further sends the adjusted data signal to one or more of the analog-to-digital (ADC) converters 31, 32, 33, 34 or the off switch N/C depending on a switching state. In other words, the combining component 21 allows the pixel 10 to be connected to any of the ADCs or disconnected completely. The combining component 21 can thus be considered a programmable multiplexer as its switching state depends on the control signal.

The operation of the polarity/gain component and the combining component is controlled via the control terminal 216. For example, the control terminal 216 is connected to a programmable control unit 4 which, during operation of the photodetector arrangement 1, determines how gain and polarity are set or adjusted. Furthermore, the control unit 4 also sets the switching state of the combining component 21 and, thus, by means of the control signal, determines whether the adjusted data signal is sent to one of the ADCs or is disconnected at all.

In other embodiments (not shown) the implementation of the readout circuit 2 can be different. For example, instead of providing a polarity/gain component 22 for each pixel, just a single component may be arranged in front of the ADCs, respectively. In other embodiments, the series connection of polarity/gain component 22 and combining component 21 is interchangeable. Furthermore, the combining component 21 may be arranged to allow for single or more connections to ADCs at a time, i.e. the adjusted data signal could be sent to more than a single ADC.

Figure 1B:
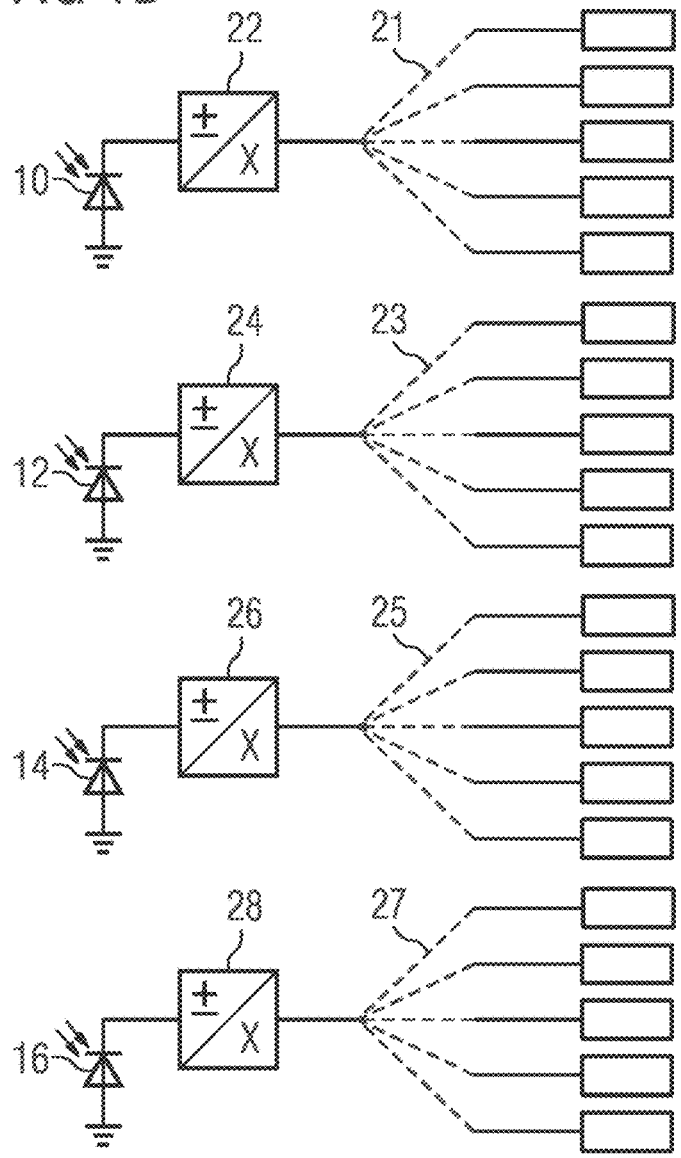
FIG. 1B shows an exemplary embodiment of a column of photodetector pixels and readout circuits.

FIG. 1B shows an exemplary embodiment of a column (or row) of photodetector pixels 10, 12, 14, 16 and readout circuits 2. The drawing represents four pixels, though the concept could be extended to any integer number N of pixels. Please note that in the drawing the combining components 21, 23, 25, 27 connect to the same set of four ADCs 31, 32, 33, 34. In an alternative embodiment any number of ADCs can be implemented.

For example, a single ADC can be assigned to the readout circuit 2. Another example could be a set of four different ADCs for each pixel. However, in some embodiments it is possible that only a single set of ADCs is attributed to the readout circuits 2 without requiring analog-to-digital conversion for each pixel.

The principles derived with respect to FIG. 1A above can be applied in analogy. The polarity/gain components 22, 24, 26, 28 and combining components 21, 23, 25, 27 are repeated for each pixel in the array of photodiodes. Correspondingly, each pixel 10, 12, 14, 16 has a unique polarity and analog gain setting via the readout circuits 2 and is controlled by the control unit 4 via respective control terminals 216. The polarity and amplification are applied to analog detection data signals from the photodiodes directly. Additionally, each pixel can be disconnected from all ADCs by means of respective off switches N/C.

Figure 2A:
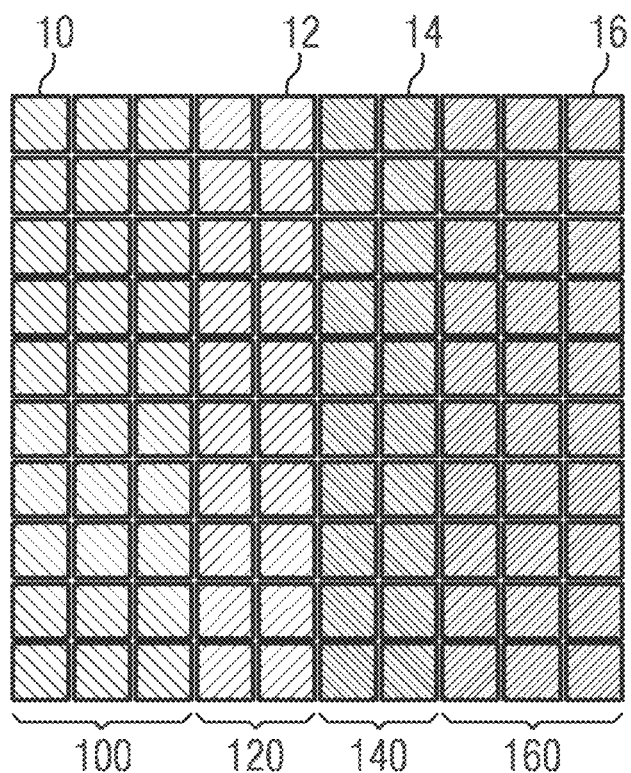
FIG. 2A shows an exemplary embodiment of an array of photodetector pixels.

FIG. 2A shows an exemplary embodiment of an array of photodetector pixels. The photodetector arrangement in this particular embodiment comprises an N×M array of photodiodes or pixels. In this particular embodiment the array comprises 100 pixels 10, 12, 14, 16 (only a single pixel for each type is assigned with a reference numeral in the drawing for easier representation) arranged in a 10×10 fashion. Each pixel is connected to a readout circuit 2 such as the ones introduced in FIGS. 1A and 1B.

In general, the array of photodetector pixels may be a monochromatic array of essentially the same type of photodiodes. For example, the photodiodes can be semiconductor devices such as PIN photodiodes, PN photodiodes, Avalanche photodiodes, and Schottky photodiodes or pinned photodiodes etc. In this particular embodiment, however, the photodetector pixels are arranged into four subarrays 100, 120, 140, 160.

The subarrays 100, 120, 140, 160 differ in spectral sensitivity, i.e. have different spectral response characteristics. Within one such subarray the photodiodes are of the same type. Photodiodes from different subarrays, however, have different color sensitivity and response. The photodiodes from the same subarrays may still be of the same type but have different color filters deposited over their light sensitive areas. However, the photodiodes may be of different type and their different spectral response is a result of different structure. For example, the photodiodes can have different junction structure, metallizations, and/or patterned filter deposition.

In this particular embodiment the photodiodes are of the same type but have filters with different spectral transmission characteristics deposited over them. For example, a first subarray 120 predominantly is sensitive in the red due to red filters. A second subarray 140 predominantly is sensitive in the green due to green filters. A third subarray 160 predominantly is sensitive in the blue due to blue filters. Finally, a fourth subarray 100 is sensitive in the red, green and blue due to clear broadband filters, or no filter at all. In this particular embodiment the first subarray 120 comprises 20 "red" photodiodes. The second subarray 140 comprises 20 "green" photodiodes. The third subarray 160 comprises 30 "blue" photodiodes. And the fourth subarray 100 comprises 30 "clear" photodiodes.

Besides an array of photodiode pixels, other sensor types are possible as well. For example, the principles derived herein can be applied to charge coupled devices (CCD) and CMOS photo sensors. Subarrays of different spectral sensitivity can be implemented by a filter matrix such as a Bayer matrix, for example. Independent of the specific sensor type the subarrays can be defined in different ways. In the drawing the subarrays are depicted as continuous areas of individual pixels. However, as will be discussed in more detail with respect to FIGS. 6 and 7 the subarrays may be spread out over the sensor area in a color matrix based on smaller unit cells such as RGB, RGBC, or RGGB cells, for example.

Figure 2B:
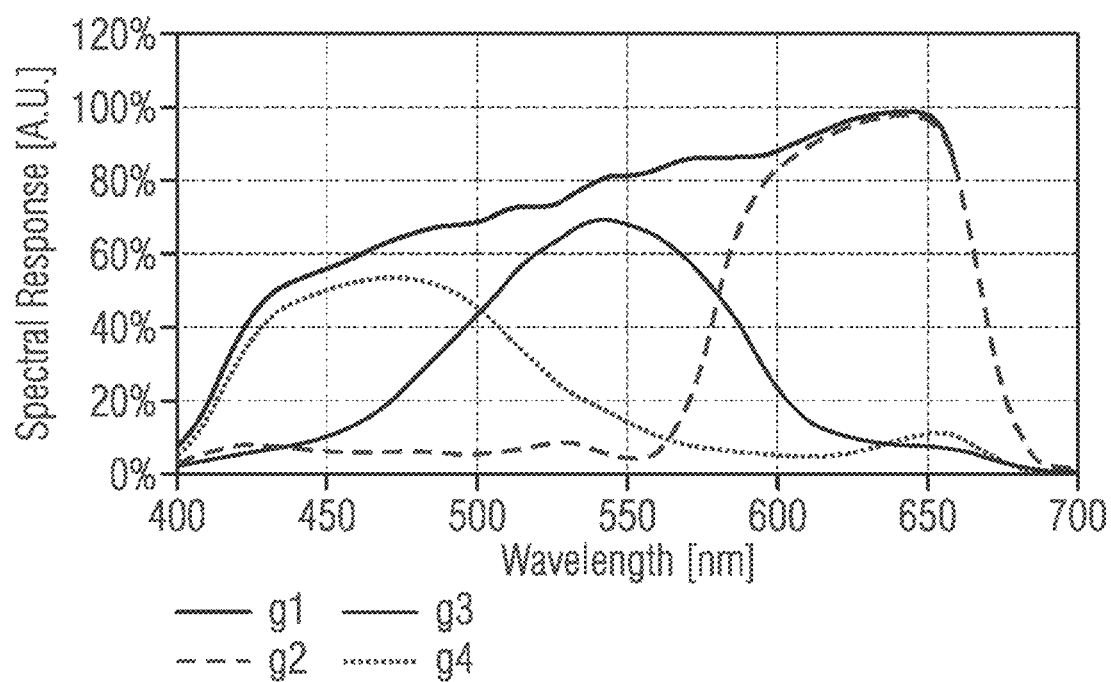
FIG. 2B shows an exemplary spectral response characteristic of an array of photodetector pixels.

FIG. 2B shows an exemplary spectral response characteristic of an array of photodetector pixels. The graph shows a spectral response of the subarrays of pixels for the sensor described in FIG. 2A. The spectral response is displayed in arbitrary units in the y-axis and as a function of wavelength (in units of nm) on the x-axis. Clearly the "red" photodiodes (graph g2) are predominantly sensitive in the red, the "green" photodiodes are predominantly sensitive in the green (graph g3), and the "blue" photodiodes are predominantly sensitive in the blue (graph g3). Photodiodes with "clear" or no filter are sensitive over a larger part of the visible spectrum (graph g1).

Typically, the array is implemented into a device and its the spectral response characteristic is altered in some way. For example, the spectral transmittance of inks used as bezels in displays do not have spectrally neutral transmittances. As a consequence the spectral response characteristic of the array of photodetector pixels generally shifts an incident light spectrum.

Figure 3A:
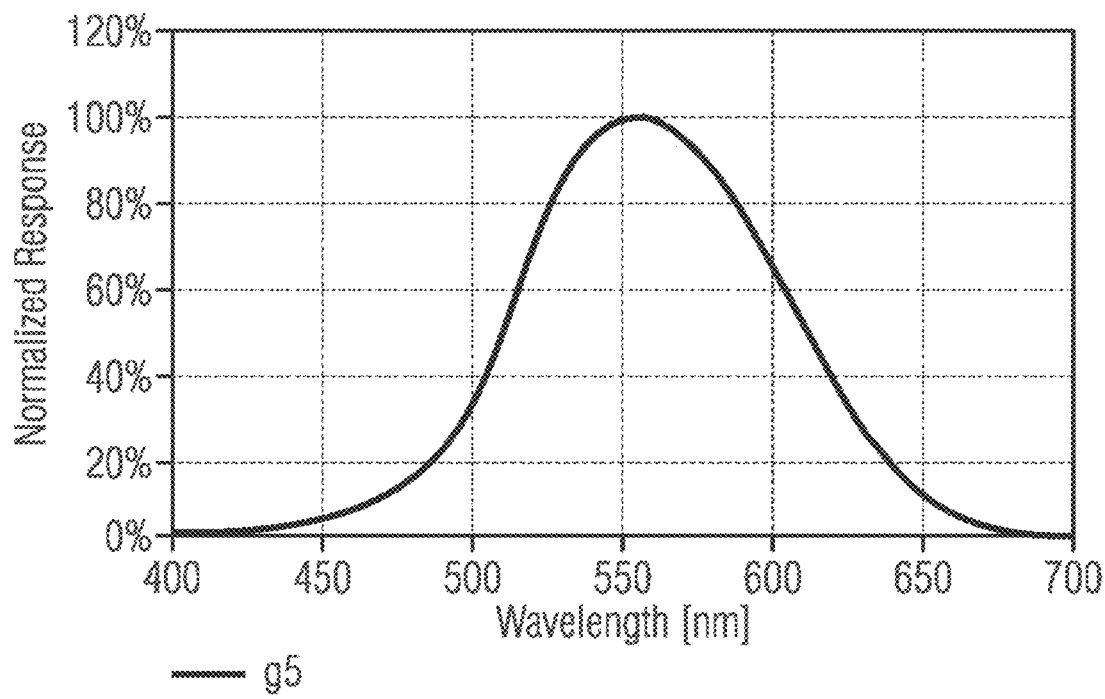
FIG. 3A shows a photopic response curve as an exemplary target curve.

FIG. 3A shows a photopic response curve as an exemplary target curve (graph g5). Often a photodetector is used to reproduce a certain target response function. For example, the goal of an ambient light sensor could be to mimic the response of the human eye, in order to measure illuminance. The graph g5 depicts how the human eye responds to energy with wavelengths between about 380 and 780 nm. The data shown in graph g5 is normalized and shows a peak around 555 nm. This is called a photopic response and constitutes one possible target response function. Whereas photopic vision describes the vision of the eye under well-lit conditions scotopic vision relates to human vision under low light conditions. Photopic and scotopic responses are other examples of target response functions. One objective of the proposed photodetector is to combine signals from the various pixels in the array (or subarrays) to reproduce a net response which is close to a target response function such as a photopic and scotopic response.

Figure 3B:
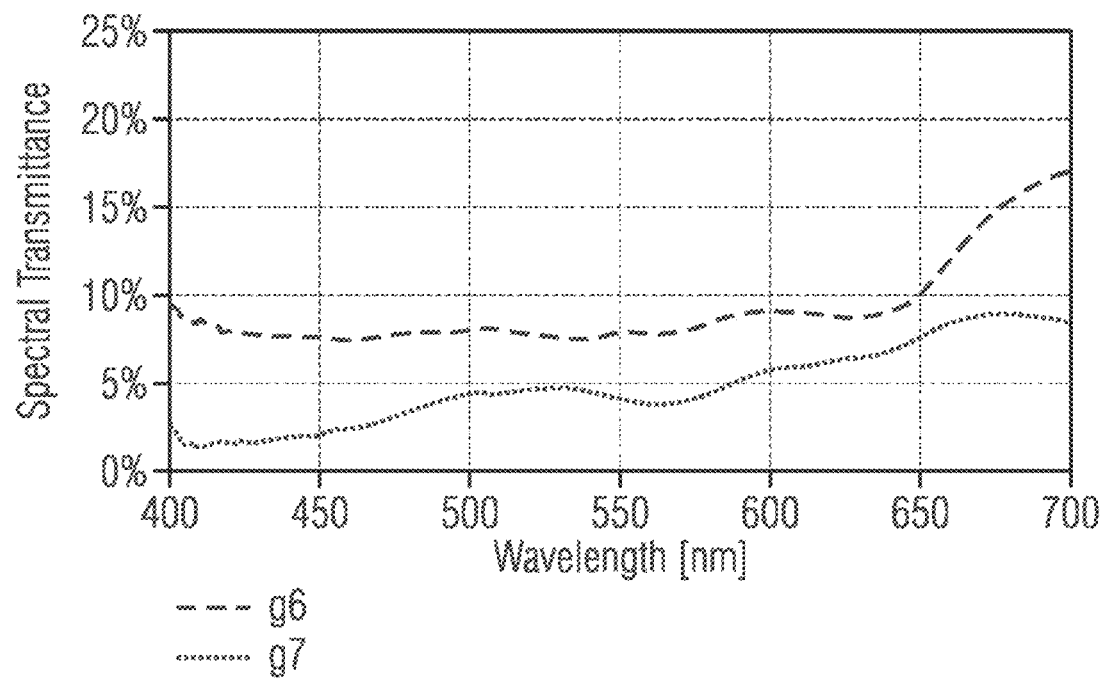
FIG. 3B shows examples of transmittance characteristics of exemplary types of inks.

FIG. 3B shows examples of transmittance characteristics of exemplary types of inks. In particular, the graph shows examples of optical transmittances (y-axis) of inks disposed on a glass cover as a function of wavelength (x-axis). Graph g6 shows a first ink and graph g7 shows a second ink. It is apparent that both inks alter the transmittance of an incident spectrum. Attenuation is often in the range of 10 to 20 times.

FIG. 3C shows exemplary shifted target curves. In typical photodetector designs the light sensitive sensor array often resides behind an ink coated display. As a consequence any target response function is altered as well. Graph g5 shows the photopic response as an example for a target response function. In order to account for the effect of the ink on the display, the target response functions for the first and second inks are calculated by dividing the photopic response (graph g5) by the transmittance characteristics of each ink, respectively. The results, i.e. shifted target response functions, are shown as normalized graph g8 for the first ink and graph g9 for the second ink.

The shifted target response functions show different dependencies on wavelength and reflect the material properties discussed with respect to FIG. 3B. This makes using the same photodetector array for multiple optical systems challenging. The array performs well for one or some of them and more poorly for others, for example. Using multiple devices with each optimized for a particular optical system design adds cost and complexity when managing many devices for the same application.

FIG. 4 shows an exemplary adjusted spectral response of a photodetector array according to the proposed concept. The following illustrates how a (spectral) response of a photodetector array can be adjusted by using a readout circuit such as the one proposed in FIGS. 1A and 1B. In fact, the response can be adjusted so as to fit the response to a target response function within a certain degree. The photodetector can be adjusted for various bezel colors and optical systems above the photodetector array. The spectral response of the photodetector is enhanced for each optical system by specifying a combination of pixels that is suitable for the optical system.

The proposed principle employs a combination of at least two elements. First, the photodetector includes a number of photodetector pixels to record analog detection data signal, e.g. the array of pixels discussed in FIGS. 1A and 1B. In some embodiments the photodetector is a color sensor including optical filters and photodiode pixels. The filters can be distributed over photodiode areas divided into the subarrays of pixels so that there are multiple pixels for each combination of filters. For example, there may be eight optical filters over a total of 32 pixels.

Second, the photodetector comprises one or more readout circuits. As will be discussed in more detail below the readout circuits are arranged to set polarity and/or gain of each pixel in the array individually using the gain/polarity component, e.g. by using operational amplifiers as gain/polarity components and multiplexers as combining components (see FIG. 8). Furthermore, each pixel can be switched on or off individually by means of the combining component. If switched on, each individual pixel can be connected to one or more of ADCs. This circuitry, i.e. the readout circuits allow any combination and quantity of pixels to be arithmetically combined, i.e. by addition, subtraction and multiplication of their analog detection data signal, to create a tailored (spectral) response. In other words the sensor response can be fitted to the target response function.

Figure 5:
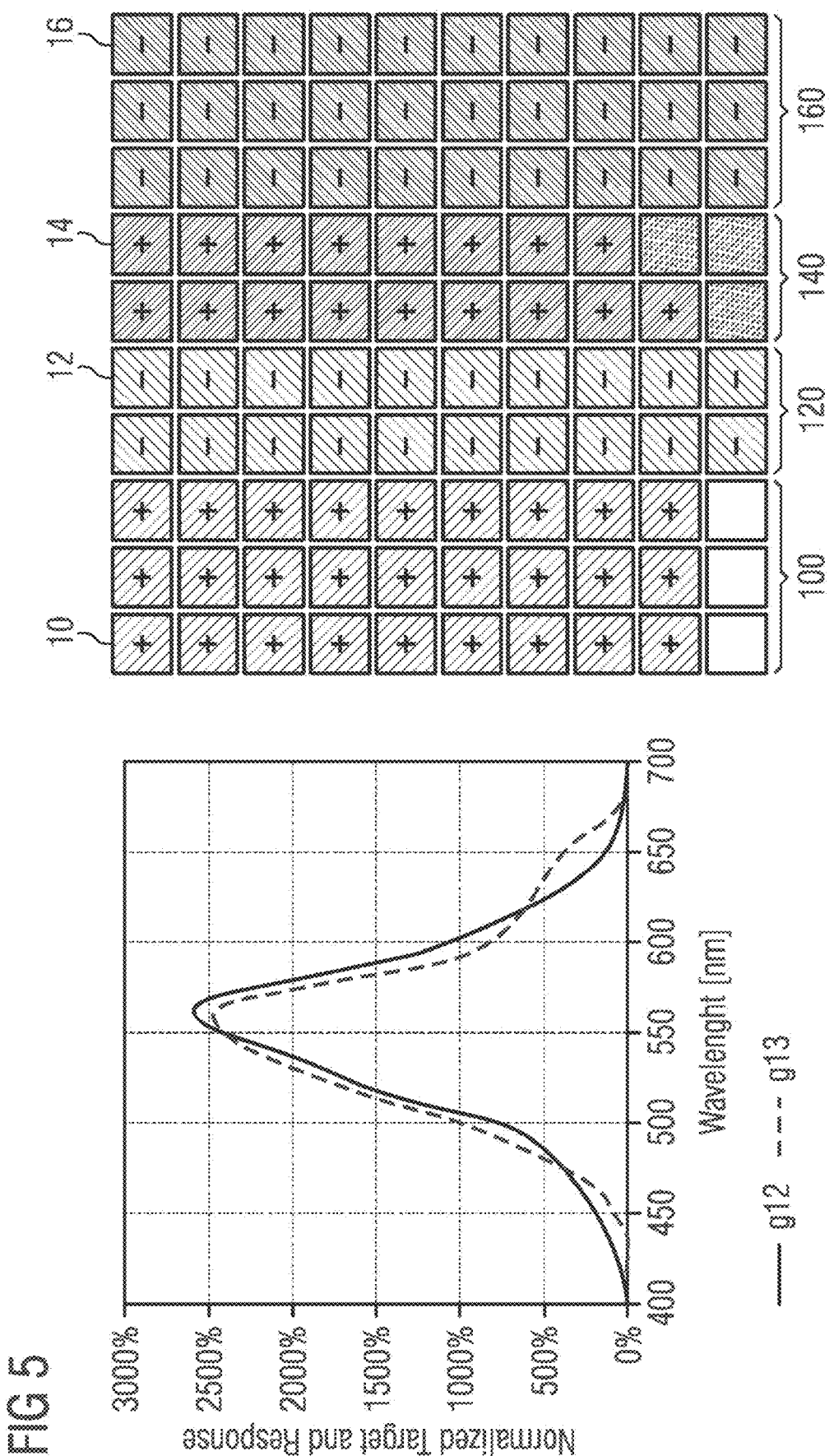
FIG. 5 shows another exemplary adjusted spectral response of a photodetector array according to the proposed concept.

The examples illustrated in FIGS. 4 and 5 are based on the following exemplary constraints and parameters. Both Figures show a RGB array with clear, red, green, and blue filters disposed over photodiodes of the same type. The RGB sensor comprises a 10×10 array of 100 pixels. Each pixel 10, 12, 14, 16 can have its own polarity and gain, but for explanation purposes adjustments of gain on the pixels are ignored. Thus, for the examples, the signals from various pixels are added or subtracted only (shown as plus or minus signs in the drawing). In addition, some pixels can be disconnected (shown as squares without any plus or minus signs in the drawing).

FIG. 4 shows the results of a glass cover with the first ink. FIG. 5 shows the results of a glass cover with the second ink. The photodetector arrangements have been configured for optimized response under each ink, respectively. The polarity of each pixel and the number of active pixels are adjusted to produce the response closest to the spectral target function. As a general result the same photodetector arrangement can produce different spectral response based on the transmittance of different optical components above the sensor. Since the response is adjusted within the analog domain, no information is lost due to quantization.

In particular, the drawing in FIG. 4 shows one way to adjust a sensor response to a photopic response under the first ink. The left side of the drawing shows the photopic response as target response function (see graph g8). The dashed graph g10 shows the adjusted sensor response as a function of wavelength. The right side of the drawing represents the photodetector array. In order to achieve the sensor response of graph g10 18 clear, 12 red, 8 green, and 15 blue pixels have been used. The red and blue polarities of each pixel (indicated by "+" and "−" signs in the drawing have been inverted, respectively. The overall adjusted sensor response OUT_adj results from $$OUT\_adj = 12 \cdot OUT\_clear - 8 \cdot OUT\_red + 12 \cdot OUT\_green - 15 \cdot OUT\_blue,$$

wherein OUT_clear, OUT_red, OUT_green, OUT_blue denote analog detection data signal of a clear, red, green, and blue pixel, respectively.

FIG. 5 shows another exemplary adjusted spectral response of a photodetector array according to the proposed concept. In particular, the drawing in FIG. 5 shows one way to adjust a sensor response to a photopic response under the second ink. The left side of the drawing shows the photopic response as target response function (see graph g9). The dashed graph g11 shows the adjusted sensor response as a function of wavelength. The right side of the drawing again represents the photodetector array. In order to achieve the sensor response of graph g9 3 clear, 3 green pixels have been disconnected. Red and blue polarities of each pixel (indicated by "+" and "−" signs in the drawing have been inverted, respectively. The overall adjusted sensor response OUT_adj results from $$OUT\_adj = 27 \cdot OUT\_clear - 20 \cdot OUT\_red + 17 \cdot OUT\_green - 30 \cdot OUT\_blue.$$

Figure 6:
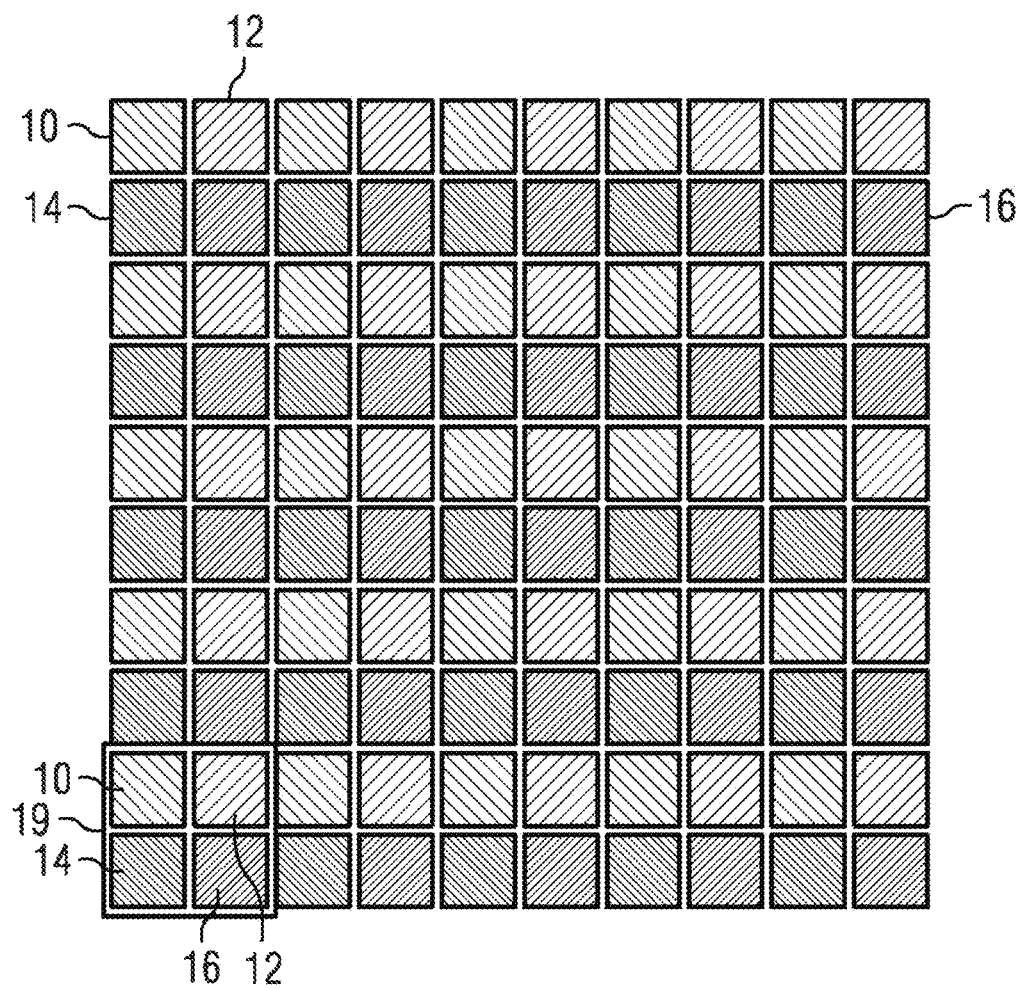
FIG. 6 shows another exemplary embodiment of an array of photodetector pixels.

FIG. 6 shows another exemplary embodiment of an array of photodetector pixels. The pixels of the array are grouped symmetrically into unit cells 19. A unit cell 18 comprises a clear, red, green, and blue pixel 10, 12, 14, 16 and is repeated several times to form the whole pixel array. The unit cell 19 can be considered a color matrix. Other color matrices are possible and the array is not restricted to clear, red, green, and blue pixels. Examples include RGB or CYGM matrices (Cyan, Yellow, Green, and Magenta) and variants thereof. The symmetry in FIG. 6 renders the array less direction dependent. For example, light incident from different angles illuminates the same or a similar amount of pixels.

Figure 7:
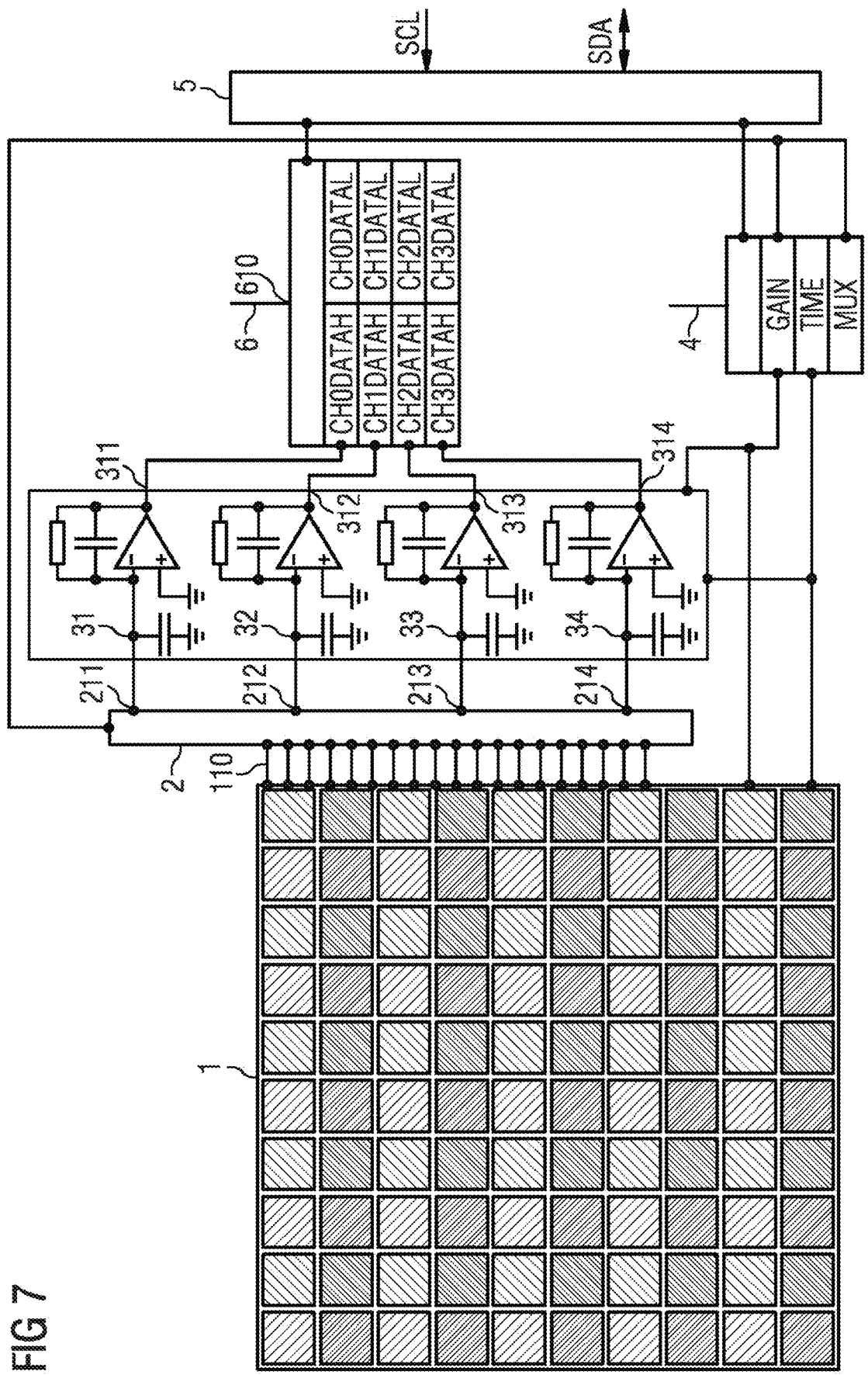
FIG. 7 shows another exemplary embodiment of a photodetector array.

FIG. 7 shows another exemplary embodiment of a photodetector array. In this embodiment the array 1 comprises 100 pixels arranged in a 10×10 symmetrical photodetector array as discussed in FIG. 6. The pixels are grouped into unit cells 19 of clear, red, green, and blue pixels. In this case, respective color filters are disposed over photodiodes to form clear, red, green, and blue pixels, respectively. The pixels can be addressed individually via a network of electrical inter-connections (not shown). The array comprises a plurality of output terminals 110. Via the output terminals each individual pixel can be addressed and connected.

The plurality of output terminals 100 are connected to a readout circuit 2. Details of the readout circuit are explained in FIGS. 1A and 1B. Further details are discussed with respect to FIG. 8. In this particular embodiment the readout circuit 2 comprises four output terminals 211, 212, 213, 214 which are connected to four ADCs 31, 32, 33, 34, respectively. The ADCs are implemented are integrating ADCs, for example. At their output side the ADCs have channel output terminals 311, 312, 313, 314.

The channel output terminals are connected to a data register 6 via channel data input terminals, respectively. The data register 6 comprises data fields, e.g. CH0DATAH, CH0DATAL, CH1DATAH, CH1DATAL, CH2DATAH, CH2DATAL, CH3DATAH, and CH3DATAL. These data fields constitute first, second, third, and fourth data CH0, CH1, CH2, and CH3 of the photodetector arrangement. Furthermore, the data register 6 has a data output terminal and a control terminal 610 connected to a control interface 5.

The control interface 5 has control input terminals SCL, SDA to receive control signals from an external control unit. The control interface may communicate using protocols such as the I2C or PWM protocol, or the like. Furthermore, a control unit 4 is coupled between the control interface 5, the ADCs, the readout circuit 2, and the photodetector array 1. Data lines connect the control unit with these components. The control unit 4 may be an external unit but could be integrated together with the photodetector arrangement into a common integrated circuit, e.g. by means of a CMOS process.

During operation the control interface 5 receives parameter signals via the control input terminals SCL, SDA. Depending on these parameter signals parameters are set at the control unit 4 which basically define the state and operation of the photodetector arrangement. For example, variables GAIN, TIME, and MUX are set and saved into the register 4. The variable GAIN sets the gain of both the integrating ADCs and the gain of the readout circuit, the gain/polarity component in particular (see FIG. 8 for further details). Variable TIME sets integration time of the array and ADCs. Variable MUX is used to control operation of the readout circuit. Basically, this variable determines which of the pixels is addressed and connected to one of the ADCs (or switched off eventually). In other words the settings of the control unit 4, e.g. a digital settings input register, determine how the analog detection data signal of the individual pixels are arithmetically combined into an overall response of the photodetector array in the analog domain.

Depending on these settings in the control unit 4 the readout circuit 2 adjusts both polarity and gain of the photocurrent generated by the pixels. The resulting adjusted photocurrent is output as an adjusted data signal and fed into one or more of the ADCs to accumulate or to integrate the gain and polarity adjusted photocurrents for a given integration time. Finally, the ADCs output digital data which is written into the data registers CH0DATAH, CH0DATAL, CH1DATAH, CH1DATAL, CH2DATAH, CH2DATAL, CH3DATAH, and CH3DATAL as digital words and, thus, constitute channel data CH0, CH1, CH2, and CH3, respectively. From there channel data can be read out via the data output.

The variables GAIN, TIME, and MUX determine the operation of readout circuit and, thus, readout of the photodetector array. For example, each pixel can be addressed individually and, thus, depending on a switching state of the readout circuit the pixels are readout sequentially one at a time. Alternatively columns or rows can be combined and read out in a line sequential manner. As part of the readout gain and polarity of each pixels are applied and adjusted by means of the gain/polarity component. Furthermore, the gain/polarity component is also arranged to add photocurrent from different pixels, for example by means of a system of operational amplifiers. As a result the gain/polarity component sets gain and polarity of individual pixels and combines these adjusted data into a single adjusted data signal. For example, this results in a combined red data signal of all red pixels, a combined green data signal of all green pixels, a combined blue data signal of all blue pixels, and a combined clear data signal of all clear pixels. In other words adjustment and combination is completely done in the analog domain and before any data signal is sent to analog-to-digital conversion in an ADC. Alternatively, however, the combination or addition of individual pixel data can also be done using the integrating ADCs, i.e. in the digital domain.

The adjustment and combination of analog detection data signal into an overall adjusted sensor response OUT_adj can be described as follows:

$$OUT_{adj} = \Sigma_i s_i \cdot p_i \cdot g_i \cdot OUT\_clear_i + \Sigma_j s_j \cdot p_j \cdot g_j \cdot OUT\_red_j + \Sigma_k s_k \cdot p_k \cdot g_k \cdot OUT\_green_k + \Sigma_l s_l \cdot p_l \cdot g_l \cdot OUT\_blue_l,$$

wherein $OUT\_clear_i$, $OUT\_red_j$, $OUT\_green_k$, $OUT\_blue_l$ with $i,j,k,l \in \{1, \ldots, N \cdot M\}$ denote analog detection data signals of clear, red, green, and blue pixels, respectively. The terms $s_i$, $p_i$ and $g_i$ etc. denote switching state (0 for "off" and 1 for "on"), polarity (+1 or −1), and (analog) gain of a given pixel, respectively. The resulting sensor response OUT_adj is adjusted to fit a given target function such as a photopic or scotopic response. The parameters, i.e. switching state, polarity, and gain, are chosen to best fit the overall adjusted sensor response OUT_adj to the target function. For example, a simulation based on known pixel responses (see FIG. 2B, for example) can be conducted to find the best fit. Also a simple permutation approach could be used. Known curve fitting processes can also be adapted, such as least square fitting etc.

Figure 8:
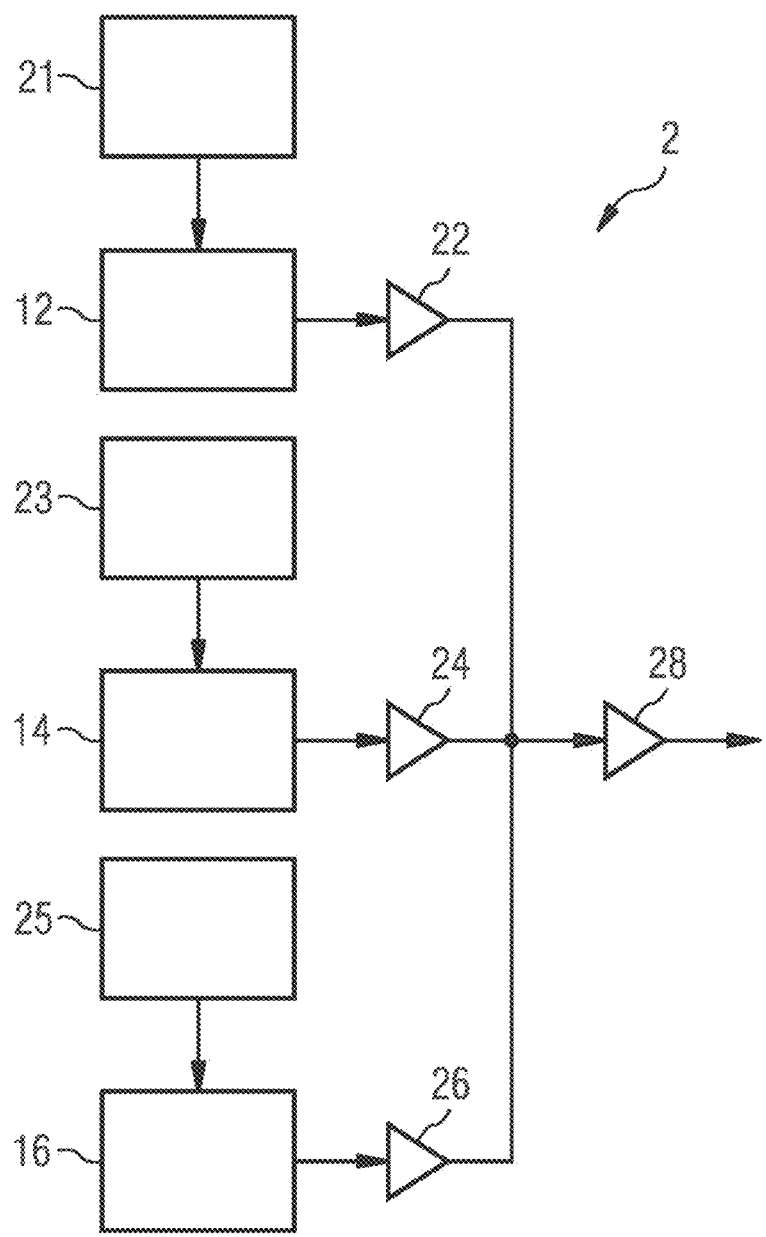
FIG. 8 shows an exemplary embodiment of a readout circuit.

FIG. 8 shows an exemplary embodiment of a readout circuit. The circuit 2 comprises combing components 21, 23, 25 to individually address a red pixel 12, a green pixel 14 and a blue pixel 16. The pixels are not shown for easier representation but could be present as well. The combing components are one possible implementation of a network of electrical inter-connections mentioned above. The combing components are arranged to connect individual pixels to respective gain/polarity components 22, 24, 26. These gain/polarity components are implemented as operational amplifiers. Both the gain and polarity can be set depending on the parameters set in the control register 4. Adjusted data signals from the pixels output by the gain/polarity components are then combined into a total sum of adjustable spectral response in a summing amplifier 18. The combined total sum can then be sent to one or more analog-to-digital converters as discussed above. In this example the combining component is hard wired an only the total sum is sent to an ADC. In an alternative embodiment the output sides of the gain/polarity components are connected to a multiplexer and depending on its switching state are connected to different ADCs to create the channel data CH0, CH1, CH2, CH3, respectively.

The overall adjusted sensor response OUT_adj may be adjusted with the photodetector arrangement arranged under a cover of an electronic device such as a mobile device. The cover may be a glass cover or a plastic cover, for example.

The invention claimed is:

1. A photodetector arrangement having adjustable output, comprising:
   a photodetector comprising an array of pixels,
      wherein each pixel is arranged to convert electromagnetic radiation into an analog detection data signal, respectively,
      wherein the photodetector comprises a color array,
      wherein the pixels are arranged into subarrays,
      wherein pixels from different subarrays have different respective spectral responses, and
      wherein pixels from the same subarray have the same spectral response,
   a readout circuit coupled to the photodetector and comprising a receiving component and a combining component,
      wherein the receiving component is arranged to read out detection data signals, to select at least one detection data signal depending on a control signal and to adjust a gain and a polarity of the selected detection data signal, and
      wherein the combining component is arranged to combine, under control of the control signal, the detection data signals from pixels within the same subarrays and/or to combine the detection data signals from different subarrays into one or more output signals to be provided at one or more output terminals, and
   a control unit coupled to the readout circuit via a control terminal and arranged to provide the control signal at the readout circuit depending on a set of instructions.

2. A photodetector arrangement according to claim 1, wherein the control signal alters the one or more output signals to match or approximate a target function.

3. The photodetector arrangement according to claim 1, wherein the combination of detection data signals and the adjustments of gain and polarity by the readout circuit is performed in the analog domain.

4. The photodetector arrangement according to claim 1, wherein the photodetector comprises a monochromatic array.

5. The photodetector arrangement according to claim 1, wherein:
   the pixels are arranged into a first, a second, a third, and a fourth subarray,
   a first type of optical filter is deposited over the pixels from the first subarray,
   a second type of optical filter is deposited over the pixels from the second subarray, and
   a third type of optical filter is deposited over the pixels from the third subarray.

6. The photodetector arrangement according to claim 5, wherein the optical filters are standardized according to a color matrix standard to allow for spectral photometric response.

7. The photodetector arrangement according to claim 1, wherein the one or more output terminals are connected to one or more analog-to-digital converters, and wherein the one or more analog-to-digital converters are connected to a data register via channel data input terminals, respectively.

8. The photodetector arrangement according to claim 7, wherein the analog-to-digital converters comprise integrating analog-to-digital converters.

9. The photodetector arrangement according to claim 1, wherein the control unit comprises a programmable data register, and wherein the control signal depends on data values stored in the programmable data register.

10. The photodetector arrangement according to claim 1, wherein the control unit comprises a microcontroller having a programmable firmware, and wherein the control signal is generated depending on a configuration of the firmware.

11. The photodetector arrangement according to claim 1, wherein the control unit is connected to a control interface having control input terminals.

12. The photodetector arrangement according to claim 1, wherein the receiving component comprises one or more operational amplifiers to adjust the gain and the polarity of selected detection data signals.

13. The photodetector arrangement according to claim 1, wherein the combining component comprises one or more analog multiplexers to combine, under control of the control signal, the detection data signals from pixels within the same subarrays and/or to combine the detection data signals from different subarrays into the one or more output signals to be provided at the one or more output terminals.

14. The photodetector arrangement according to claim 1, wherein the control signal depends on a target function, and wherein the target function is a photopic and/or scotopic target function.

15. A method for adjusting an output of a photodetector arrangement, the photodetector arrangement comprising a photodetector having an array of pixels, wherein the photodetector comprises a color array, wherein the pixels are arranged into subarrays, wherein pixels from different subarrays have different respective spectral responses, and wherein pixels from the same subarray have the same spectral response, the method comprising:

for each pixel, converting electromagnetic radiation into a respective analog detection data signal, reading out the detection signals, selecting at least one detection signal, adjusting again and a polarity of the selected detection data signal depending on a control signal, combining, under control of the control signal, the detection data signals from pixels within the same subarrays and/or the detection data signals from different subarrays into one or more output signals, and providing the one or more output signals at one or more output terminals.

16. The method according to claim 15, wherein the control signal depends on a target function such that by selecting the at least one detection signal, adjusting the gain and the polarity of the selected detection data signal and combining the detection data signals into one or more output signals, the one or more output signals approximates the target function.

17. The method according to claim 15, wherein the one or more target functions are photopic and/or scotopic functions.

18. The method according to claim 15, wherein the analog detection data signals are adjusted and combined into an overall adjusted sensor response OUT_adj according to the relationship:

$$OUT_{adj} = \Sigma_i s_i \cdot p_i \cdot g_i \cdot OUT\_clear_i + \Sigma_j s_j \cdot p_j \cdot g_j \cdot OUT\_red_j + \Sigma_k s_k \cdot p_k \cdot g_k \cdot OUT\_green_k + \Sigma_l s_l \cdot p_l \cdot g_l \cdot OUT\_blue_l$$

wherein $OUT\_clear_i$, $OUT\_red_j$, $OUT\_green_k$, $OUT\_blue_l$ with $i,j,k,l \in \{1, \ldots, N \cdot M\}$ denote analog detection data signals of clear, red, green, and blue pixels, respectively, wherein the terms $s_m$, $p_m$ and $g_m$ with $m \in \{t,j,k,l\}$ denote switching state with 0 for "off" and 1 for "on", a polarity with +1 or −1, and an analog gain of a given pixel, respectively.

19. The method according to claim 18, wherein the overall adjusted sensor response OUT_adj is adjusted so as to fit the target function within a certain degree.

20. The method according to claim 18, wherein the overall adjusted sensor response OUT_adj is adjusted with the photodetector arrangement arranged under a cover of an electronic device and/or arranged under a glass cover.

* * * * *